UNITED STATES PATENT OFFICE.

FRIEDRICH STOLZ AND GEORG KORNDÖRFER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY.

1-PARA-DIMETHYLAMINOPHENYL-2. 3. 4-TRIMETHYL-5-PYRAZOLONE AND PROCESS OF MAKING SAME.

990,310.      Specification of Letters Patent.      Patented Apr. 25, 1911.

No Drawing.      Application filed June 14, 1910. Serial No. 566,816.

*To all whom it may concern:*

Be it known that we, FRIEDRICH STOLZ, Ph. D., chemist, and GEORG KORNDÖRFER, Ph. D., chemist, citizens of the Empire of Germany, residing at Höchst-on-the-Main, Germany, have invented certain new and useful Improvements in 1-Para-Dimethylaminophenyl-2. 3. 4-Trimethyl-5-Pyrazolone and Processes of Making the Same, of which the following is a specification.

We have found that by methylating the para-aminophenyl-2. 3. 4-trimethyl-5-pyrazolone, 1-para-dimethylaminophenyl-2. 3. 4-trimethyl-5-pyrazolone is obtained, having the structural formula

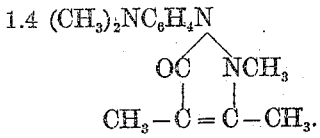

This new compound is of great therapeutical value; it is favorably distinguished from the 1-para-dimethylaminophenyl-2. 3-dimethyl-5-pyrazolone by being much less poisonous without its efficacy being thereby diminished. It could not be foreseen that the said result would be obtained by the introduction of a methyl group, because, for instance tolypyrin and methylantipyrin are more poisonous than antipyrin, whereas the new methylated compound possesses the opposite property as compared with the parent product.

One method of preparing 1-para-dimethylaminophenyl-2. 3. 4-trimethyl-5-pyrazolone consists in methylating 1-para-aminophenyl-2. 3. 4-trimethyl-5-pyrazolone in the usual manner, for instance by heating it with methyl-iodid with addition of methyl alcohol.

Example: 2 parts by weight of para-aminophenyl-2. 3. 4-trimethyl-5-pyrazolone are heated with one part of methyl-iodid and one part of methyl-alcohol for 5 hours at 90°–100°. After cooling the product of the reaction is dissolved in water, the solution oversaturated with alkali and the methylated base shaken out with benzene or some other suitable solvent. The product left after the benzene has been distilled off can be purified by dissolving it in water and recrystallizing it from ethyl-acetate or alcohol.

The para-dimethylaminophenyl trimethyl pyrazolone crystallizes from water with water of crystallization. When well dried the compound melts at about 140°; it is pretty readily soluble in water, readily soluble in dilute acids, alcohol, benzene, and chloroform; its aqueous solution, when treated with ferric chlorid, assumes a red coloration; no reaction occurs in presence of nitrous acid.

The aforesaid 1-para-aminophenyl-2. 3. 4-trimethyl-5-pyrazolone can be produced from para-nitrophenyl-2. 3. 4-trimethyl-5-pyrazolone, described in U. S. Patent No. 936,380, by reduction with tin and hydrochloric acid. On supersaturating with caustic soda lye, the 1-para-aminophenyl-2. 3. 4-trimethyl-5-pyrazolone separates from the hydrochloric solution, after being freed from the tin and evaporated, as a white crystalline powder. The base thus obtained crystallizes from hot water in the form of colorless crystals containing two molecules of water of crystallization; when free from water, it melts at 225–227°.

Having now particularly described our invention, what we claim is:

1. The process of manufacturing 1-para-dimethylaminophenyl-2. 3. 4-trimethyl-5-pyrazolone, which consists in methylating 1-para-aminophenyl-2. 3. 4-trimethyl-5-pyrazolone.

2. As a new product, 1-para-dimethylaminophenyl-2. 3. 4-trimethyl-5-pyrazolone, being a white, well crystallizing powder melting at about 140°, readily soluble in dilute acids, alcohol, benzene and chloroform, pretty readily soluble in water, and yielding, when dissolved in water with ferric chlorid, a red solution.

In testimony whereof, we affix our signatures in presence of two witnesses.

FRIEDRICH STOLZ.
GEORG KORNDÖRFER.

Witnesses:
   JEAN GRUND,
   CARL GRUND.